United States Patent [19]
Knight et al.

[11] Patent Number: 5,745,693
[45] Date of Patent: Apr. 28, 1998

[54] SYSTEM FOR GATHERING AND REPORTING REAL TIME DATA FROM AN IDNX COMMUNICATIONS NETWORK

[75] Inventors: William Knight, Plano; Stephen W. Davies, Austin, both of Tex.; J. Gene Cannata, Cary, N.C.

[73] Assignee: MCI Corporation, Washington, D.C.

[21] Appl. No.: 769,384

[22] Filed: Dec. 19, 1996

Related U.S. Application Data

[63] Continuation of Ser. No. 906,861, Jul. 1, 1992, abandoned.
[51] Int. Cl.⁶ .................................................. G06F 15/177
[52] U.S. Cl. .................................................. 395/200.54
[58] Field of Search ........................... 395/800, 200.1, 395/200.11, 200.5, 200.51, 200.52, 200.53, 200.54, 200.55, 200.56; 370/85.5, 825.06, 254, 255, 256, 257, 258

[56] References Cited

U.S. PATENT DOCUMENTS

| | | | |
|---|---|---|---|
| 5,049,873 | 9/1991 | Robins et al. | 340/825.06 |
| 5,175,800 | 12/1992 | Galis et al. | 395/51 |
| 5,179,695 | 1/1993 | Derr et al. | 395/575 |
| 5,247,517 | 9/1993 | Ross et al. | 370/85.5 |
| 5,251,152 | 10/1993 | Notess | 395/800 |
| 5,299,207 | 3/1994 | Fujii | 395/575 |

OTHER PUBLICATIONS

Feridun et al., "ANM: Automated Network Management System," IEEE Network, vol. 2, No. 2, Mar. 1988.

Cronin et al, "Network Control Center", National Telecommunications Conference, Nov. 29, 1981–Dec. 3, 1981, P.G7.3.1–G7.3.6.

*Primary Examiner*—Richard L. Ellis

[57] ABSTRACT

A system for analyzing communication network events on a historical basis based on records received from the network. A data processing system is connected via a first communications co-processor to a node of the network, permitting access to the node processor event log. In response to an inquiry sent from the data processing system, the events are collected as they are reported to the node processor. A record of the events is made in a table corresponding to the particular type of event received. The records in all tables may be sorted based on dates supplied by a system operator. The sorted records comprise a report identifying particular network elements which constituted an event during the reporting period.

8 Claims, 4 Drawing Sheets

SYSTEM FOR GATHERING AND REPORTING REAL TIME DATA FROM AN IDNX COMMUNICATIONS NETWORK

This application is a continuation of application No. 07/906,861, filed Jul. 1, 1992 now abandoned.

BACKGROUND OF INVENTION

The present invention relates to apparatus for reporting and summarizing events which occur on an IDNX communications network. Specifically, a system for collecting event data from the operator interface (OI) of an IDNX network node processor is described, which will permit an historical evaluation of the events occurring on the IDNX network relating to network performance.

The IDNX networks in use nationwide permit various communication services to be provided between distant users. The basic architecture of such networks includes a plurality of nodes which form an interface to customers desiring access to the IDNX network. The nodes are in turn interconnected by trunks to the nodes which ultimately provide for communications between ports of different nodes.

The nodes are organized and operated in accordance with a stored program processor at each node. In the current IDNX networks in use, events occurring on the networks are reported as an event to each control processor of a node. Thus, as links connecting the node are removed or fail, or cards or ports are added to a node to give additional access to the network, these events affecting network performance are reported to a local event log of a given node. Some events are also stamped as a field network event which is to be logged at two special network event nodes at the time it occurs.

The present system for logging these events, both those which would be identified as being only local to a node, and those further stamped as being of network-wide interest, does not provide for a system which will provide an historical analysis of events occurring over the IDNX network. Thus, postmortem analysis of the network in the face of changes to the network architecture, i.e., such as the addition of new cards or ports, as well as failures occurring on the network may not be analyzed from an historical perspective. In most failure scenarios, a certain time elapses between the time a particular link or card failure may have occurred in the network and the time the link, card, port or other network architecture element is returned to service. While the local node processors of the network provide for a reliable logging of these events, there currently is no opportunity for analyzing such events over time. Thus, as each of the node processors make adjustments for the various failures and changes which occur in the network, no ability to monitor the performance of these changes which occur over time is provided.

As currently configured, the IDNX network logs provide for a data stream which will indicate the type of failure or change to the network which has occurred along with the date and time in which it occurred. These two pieces of information are particularly valuable in a postmortem analysis.

The present invention seeks to collect such event data from the network and permit a postmortem analysis to be made, based on any criteria reported in the accumulated events. Of particular interest are reports which indicate network changes which occur over a particular date and time interval.

SUMMARY OF INVENTION

It is an object of this invention to provide an apparatus which will produce an historical analysis of events occurring on an IDNX communications network.

It is a more specific object of this invention to provide for a highly reliable system which collects from a pair of network nodes of an IDNX network, all field network events on a real time basis.

It is a more specific object of this invention to provide for analysis of network events which occur over selected time intervals.

It is yet an even more specific object of this invention to generate reports which describe activities which have occurred on the network over a specific period of time.

In carrying out the invention, the co-processors are connected via a standard interface to the processor of the network event nodes on the IDNX network which have network event logs. The two co-processors communicate via the standard interface with the node Operator Interface Software, and receive all network field event data which is to be logged in all of the nodes. One of the co-processors is connected to a main processor for reporting each network field event to the main processor. The second co-processor is connected to the second node and a remote processing system which forms a backup unit for collecting the network event data from a second network event node. In the event that the main processor is disabled or unavailable to collect field network events which occur on the network, the backup unit will collect these events as they occur. The remote processor will, at a time convenient for the main processor, download the collected data to the main processor so that no field network events are missed. The main processor and remote processor communicate through their bus structures via the pair of co-processors.

In operation, the main processor is capable of creating a data base consisting of tables which identify the configuration of the network. The status of each element in the configuration is maintained in a table, which reflects the changes which occur in the network over time.

Additional to maintaining a record of the configuration of the network, the data base table contains availability data for elements of the network. This availability data may include node availability, call availability, and circuit availability information.

An event table is also included in the data base which will store in a single table, other types of events relating to network performance.

In accordance with the preferred embodiment of the invention, reports can be generated based on the information contained in the data base describing the system performance over time. By the use of operator displayed prompts, a system analyst can generate reports which may be formatted in terms of the equipment which existed on the network during a given time period, availability reports as to the availability of nodes, trunks and calls on the IDNX network, or quality reports to monitor bit error rate (BER) statistics.

Thus, the data base which is accumulated over time provides for the system analyst the capability of a limitless number of report formats for describing significant events occurring over the network.

DETAILED DESCRIPTION

Figure 1:
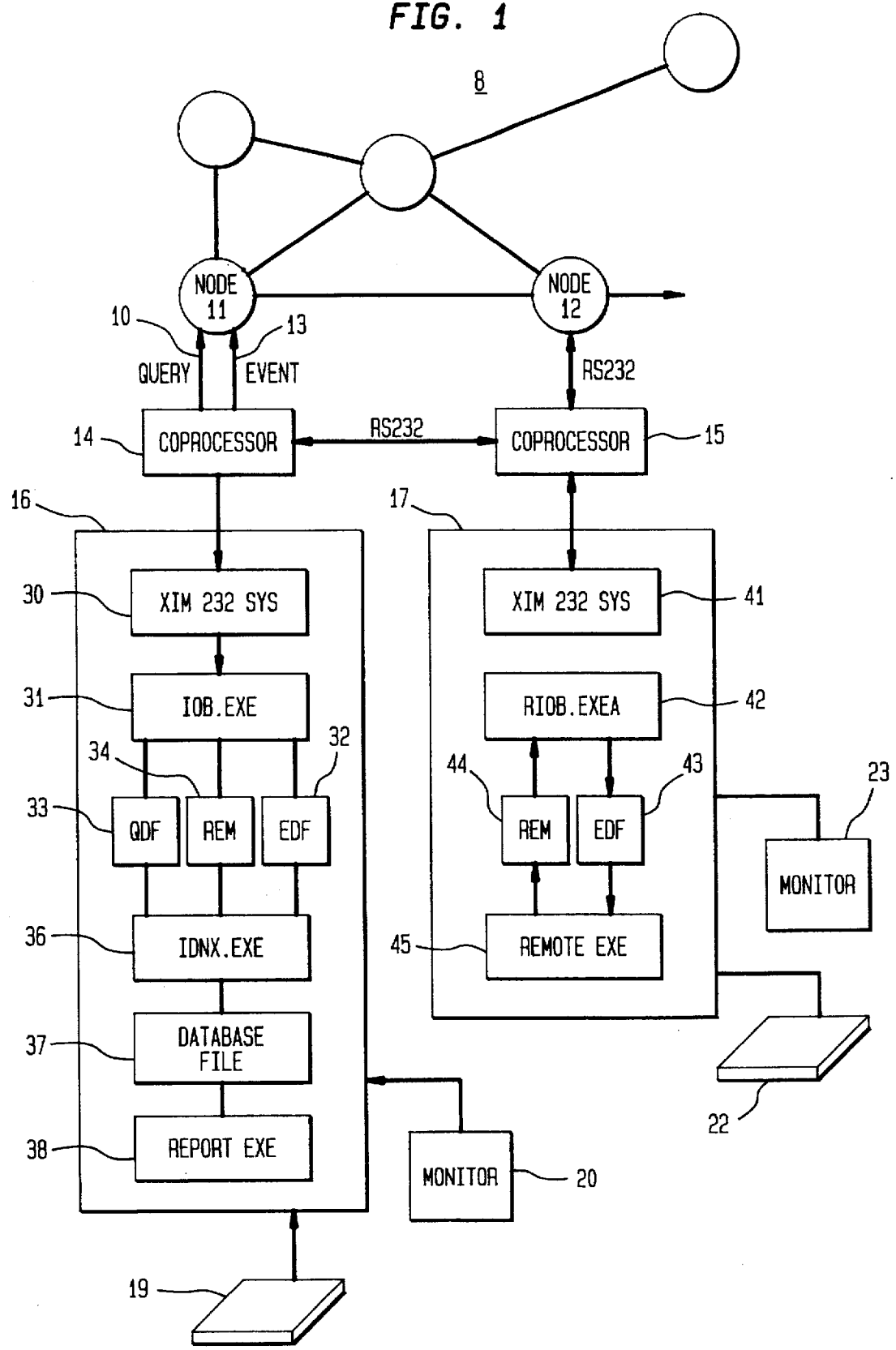
FIG. 1 is an overall block diagram of apparatus in accordance with a preferred embodiment for collecting network event data and which permits analysis of the data on historical basis.

Referring now to FIG. 1 there is shown an overall block diagram of an apparatus in accordance with a preferred embodiment which will store and analyze significant events occurring on an IDNX network. The events may take the form of data identifying a hardware failure such as a trunk or card failure or it may take the form of reporting a change to a network such as the addition of a port or a new card or the addition of a link structure between nodes. Further, such events may contain information relating to network quality such as bit error rate which are reported as network field event data to the event logs of two nodes on the network.

A main processor 16 which may be a personal computer with an INTEL 80486 processor having a 33 mHz clock is shown which communicates via a co-processor 14 with the processor of node 11 of the IDNX network 8. The IDNX network carries data traffic over a plurality of nodes via a plurality of trunks. The communication occurs over a standard interface such as an RS 232, permitting the collection of event data in the node 11 network event log to be transferred to a data base file 37 within the main processor 16. The main processor 16 is illustrated in terms of levels of software which is necessary for transferring the network field events obtained from the event log of node 11 to the data base file 37.

The co-processor 14 provides essentially three channels of communication for the main processor 16. The first is a query channel 10 permitting inquiries to be made to the processor associated with node 11 and received in response to the inquiry specific details about a reported event. The second channel is an event channel 13 which will receive reported events as they occur and are reported to the event log of the node processor of node 11. Further, a third channel communicates with a co-processor 15 associated with a remote backup processor 17. The co-processor 15 is connected via RS 232 port to the co-processor 14 to permit the main processor 16 to recover event data which may have been lost by the main processor 16 due to equipment failures, or other interruptions, which were continuously collected by the remote processor 17.

The co-processors 14 and 15 may be a Digi board co-processor, available from the Digi International Company. The type of co-processor selected however is not limited to the foregoing but is a peripheral which permits the handling of a message as it is received on one of its ports, and stores each character of the message. When multiple characters, constituting possibly an entire event, have been accumulated in the memory of the co-processor board, a single interrupt request is issued to the main processor 16. This single request will result in a downloading of the entire stored event, saving processing power and avoiding more frequent interruption of the main processor 16 which diminishes the processing capability of the main processor 16.

Each of the three channels of the co-processor 14 can be accessed by the main processor 16. A software interface XIM 232.SYS 30 operates in the main processor 16 in conjunction with IOB.EXE31 to either download data from the co-processor 14 or furnish a query request to the connected node 11 processor for obtaining data which may be stored in the event log of the processor of node 11.

The actual interface between the co-processor 14 and main processor 16 is carried out by IOB.EXE31. IOB.EXE will collect event data being accumulated in the co-processor 14 and store it in an event data file 32. Additionally, when requested by IDNX.EXE36, the IOB.EXE31 routine will issue a query to the node processor of node 11 through co-processor 14 and a query channel 10 to the processor of node 11.

Additionally, a remote data file 34 is shown in main processor 16. The remote data file will receive event data which may be resident in the remote processor 17. In the event that the main processor 16 misses data due to a failure or down time of the main processor 16, IOB.EXE31 will have retrieved from the remote data file 34 of the remote processor 17 the same event information. The remote data file 34 thus contains any information which was not collected by the main processor 16 in event data file 32.

The main processor 16 runs from two application programs, IDNX.EXE36 and REPORT.EXE38. The first of these application programs IDNX.EXE36 operates to build the data base 37 from event data contained in the event logs of the node processor 11, and continuously update the data base 37 such that a historical record is maintained of events occurring over the IDNX network. The REPORT.EXE Application Program 38 permits searching the created data base 37 to provide reports of events which have occurred over the IDNX network. Using a keyboard interface 19 and monitor 20, a system analyst can request any of a virtually limitless number of report formats for reviewing the operation of the IDNX network over a time period of interest. In one example of the preferred embodiment of the invention, the monitor 20 will display a menu requesting whether a report relating to system quality, configuration, or availability of such features as links, circuits, or nodes is desired. Upon selection by the system analyst via keyboard 19, a further inquiry is made to identify the particular report, and the period of time over which events to be reported are made by the system analyst.

The system operation includes a phase for initially building the data base to accurately reflect the equipment and performance of the network. The starting point for this process can be described as follows.

Initially the IDNX.EXE Application Program 36 will send an inquiry known as a QUERY command via the IOB.EXE routine 31 over the query channel 10 to request configuration data from the node processor 11. This configuration data comprises the information identifying the connection of the nodes, links, circuits, cards, trunks, ports and information regarding the calls in progress over the network. As will be evident from FIG. 2, this information identifies the current operating conditions of the IDNX network, from which point forward records are kept concerning changes to the network configuration and performance.

The QUERY command is issued to obtain all of the pertinent information regarding these network elements.

Response to a QUERY command is received by the co-processor 14 over a query event channel 13, and upon accumulation of significant amounts of the configuration data, reports the same via the software interface 30 to IOB.EXE31 which stores the data in the query data file 33.

Figure 2:
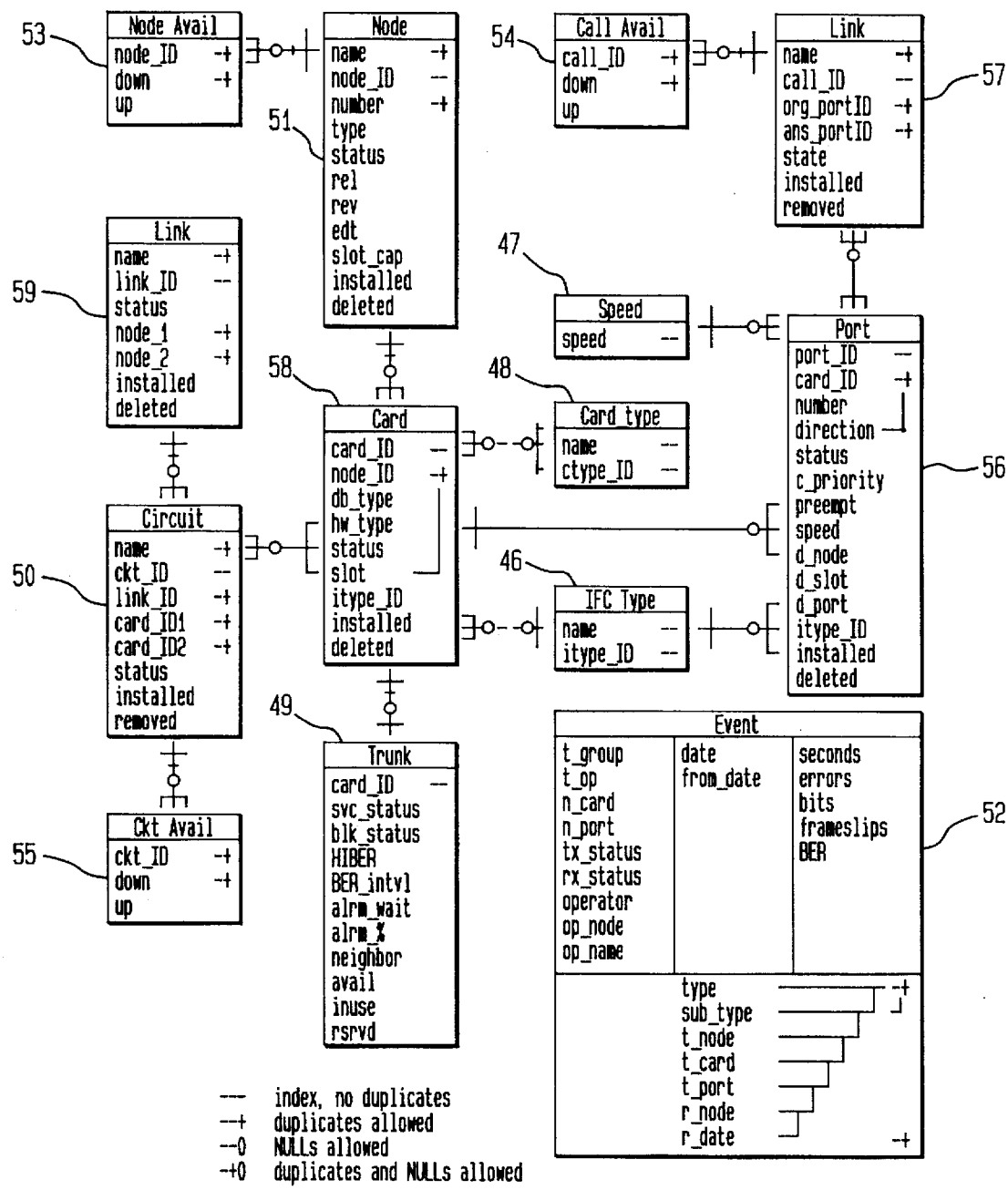
FIG. 2 is an illustration of the data base configuration of the main processor 16 of the preferred embodiment.

As the query data file 33 accumulates the responses to the QUERY commands for building the data base file 37, IDNX.EXE will parse the data obtained from the query data file 33. The parsed data, which consists of only essential information obtained from the network event log is inserted in table form, such as is shown in FIG. 2, on the data base file 37.

Subsequent to building the network configuration on the data base file 37, events as they occur may be used to update the data base file 37. Events which are stamped by the node processor of node 11 as field events, for entry in the field event data log of the node 11 processor, are reported immediately to the co-processor 14 via query event channel 13 constituted by a second port on the co-processor 14. The event data is accumulated in memory in the co-processor 14 and is periodically transferred by IOB.EXE31 to a second buffer file 32. Buffer file 32 is the event data file which contains the most recently reported events occurring on the network 8.

Thus, the data describing subsequent changes to the IDNX network is available for storage on the main processor data base file 37.

The application program IDNX.EXE36 will periodically update the data base file 37 based on the new event data. In operation IDNX.EXE36 will issue a QUERY command to the processor of node 11 for all information relating to the event. The response to the QUERY command is received over the query channel 10 and stored in the query data file 33. IDNX.EXE36 will update the data base file by creating a new record in the appropriate table of FIG. 2 reflecting the changes which indicated by the event.

In this process no files are destroyed in the data base 37, or information deleted within the file. This permits an accumulation of records to occur over a time interval which may span months or even years. Thus, separate records exists within the data base file 37 which may be searched, over any period of time, to identify changes occurring on the IDNX network 8.

A third buffer file 34 is shown to store remote data which may be transferred from the remote processor 17. The buffer 34 will be periodically updated upon command of the RIOB.EXEA software routine 42 such that there is redundant event data, corresponding to the contents of event data buffer 32. Thus, if IDNX.EXE36 determines that any data may have been missed, as reported from node 11, it may resort to the information buffer file 34. In this way, no data is missed and the records contained in the data base file 37 are maintained accurately in light of a failure or other downtime incurred by the main processor 16.

The organization of the remote processor 17 is similar to that of the main processor 16. The remote processor 16, however, does not contain a permanent data base file 37 nor does it need to initially configure a data base file. Thus, the co-processor 15 in reality only has two ports in use. The first port constitutes an event channel, for receiving the field event data as it is reported to a second node 12, as field event data to be logged in a log contained in the processor associated with node 12. The second port is a remote port which communicates with co-processor 14 permitting the downloading of accumulated event data to the co-processor 14 for storage in the buffer 34.

The remote processor 17 which may be a personal computer having an INTEL 80386 processor of 25 mHz clock speed includes a software interface XIM232.SYS41 similar to the interface routine 30. Additionally, a routine 42 is shown which will retrieve the data accumulated in co-processor 15 and store the data in a buffer file 43. A remote file 44 is used to temporarily store information which is to be transferred over to remote buffer file 34. A main program REMOTE.EXE46 runs in the foreground, while the interface program RIOB.EXE42 runs in the background of the processor 17. RIOB.EXE42 running in the background will obtain node events from the node processor of node 12. The background program RIOB.EXE42 operates approximately 19 times a second during the execution of REMOTE.EXE45.

REMOTE.EXE45 will download data in the event buffer file 43 via the remote buffer file 34. As will be evident with respect to FIG. 3, this data is eventually transferred to the remote buffer file 34 of the main processor 16. Keyboard 22 and monitor 23 are used to program the remote processor 17 during setup following which they are not normally needed.

Thus, it is clear that the system of FIG. 1 is designed such that no event data would be lost in the event the main processor 16 was disabled.

The organization of the data base file 37 is shown more particularly in FIG. 2. The data base of FIG. 2 includes certain tables which relate to availability, i.e., node availability 53, circuit availability 50, call availability 57. These records will indicate when a specific node, or a call, or circuit was unavailable by date and time. These events, reported to the event data log of the processors of nodes 11 and 12, constitutes an individual record regarding each of the nodes, calls, and circuits for the network.

Other tables contained in the data base scheme such as node 51, card 58, trunk card 49, port 56, link 59, circuit 50 and call 57 tables, identify configuration elements of the network. As these configuration elements change, a record is made in each of the respective tables, identifying the change. That is, when a call, port, circuit, link or trunk card is installed or removed, a record is made of that fact in the appropriate table.

Each of the tables are linked together as shown in FIG. 2. For instance, a speed table 47 is shown to store a list of all data rates known to the system. Each port table record 56, is referenced to one of these entries, as the port has a data rate associated therewith identified by the speed. The card type table 48 is shown which stores a list of all card types known to the system. Each card table record will reference one of these entries. An IFC (interface) type table 46 is shown which will store a list of all interface types known to the system. Each card table references one of these entries. By so associating separate tables with other tables, it is possible to keep the size of individual tables, i.e., a port table to a reasonable size.

A port is the input and output to the IDNX network. Certain types of cards form a port. Ports formed by these data cards are either two ports or four ports. The table identified as the Port Table 56 identifies one record for each port known to the report processor.

The call record is comprised of two ports configured from two cards. Data is transmitted from one port to the other forming a continuous path through the network. The term "call" is used because the transmission of the data is similar to placing a telephone call. Two telephones are needed to make a phone call. A call record contains two links to the port table the entries ORG/PORT ID AND ANS-PORT ID provide the connection to the port table records.

Figure 3:
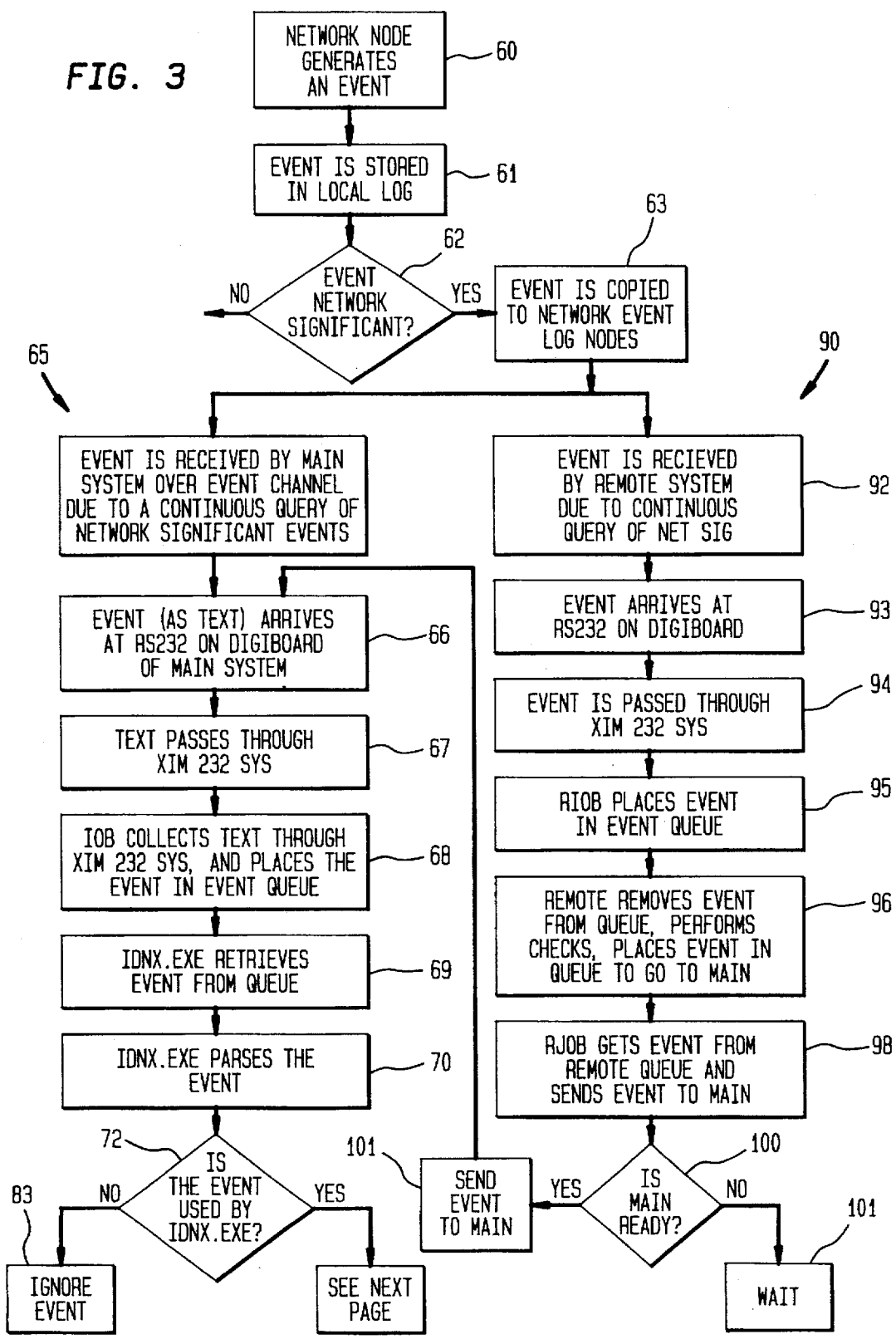
FIG. 3 is a flow chart illustrating the operation of the system of FIG. 1 in collecting event data as it occurs and updating the data base and the main processor with the data events.

Having just explained the overall details of the report processing system, reference may be had to FIG. 3 which illustrates how an event gets detected, and the data base modified to record the event.

Figure 4:
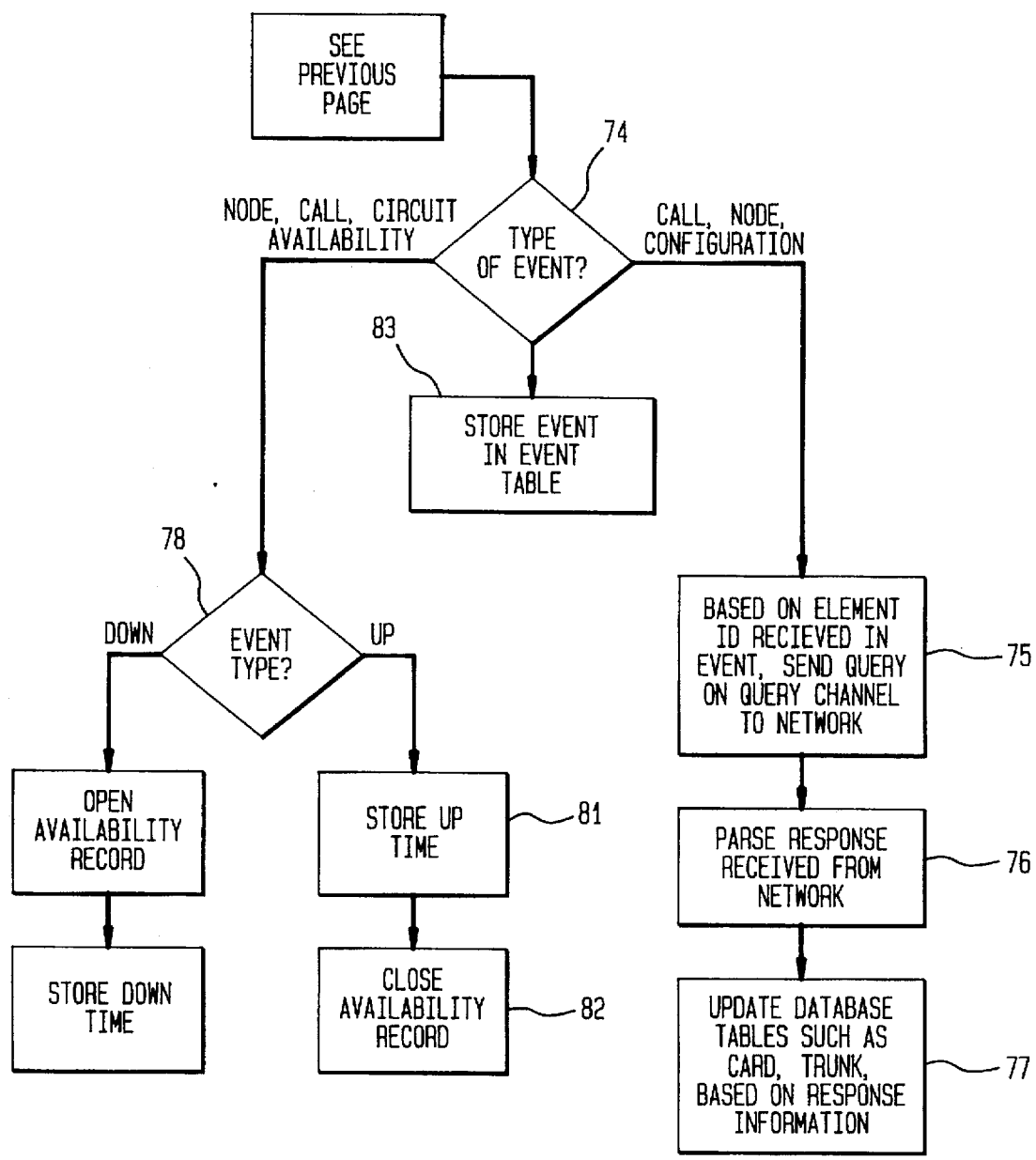
FIG. 4 is a flow chart illustrating the processing of the collected events.

Referring now to FIGS. 3 and 4, the beginning of the event collection process is shown in step 60. When the network generates a field event recorded in its network event logs, the event 60 is stored in a local log 61 of a node. If this is a field event to be recorded in the network event log, decision block 62 indicates that the node processor will copy in step 63 the event to the field event log.

As both the remote processor 17 and main processor 16 are receiving the events, the main processor represented by path 65 will receive over the event channel 13 the information, as a result of a continuous query of network significant events by IOB.EXE31 of FIG. 1. This event is in the form of a character string of text which arrives in step 66 to the co-processor 14 in response to continuous query by IOB.EXE31. The text will pass through the software interface 30 in step 67 and be collected by the software routine 31 in the event buffer file 32 of main processor 16 in step 68. IDNX.EXE Application Program 36 will retrieve the event from the data buffer file 32 in step 69. IDNX.EXE will parse the event in step 70, so that appropriate decisions can be made based on the event.

Decision block 72 will determine whether this is an event which is used in the data base file 37. If it is not one of those events of interest it is ignored in step 73.

If it is determined to be an event to be used to update the data base file 37, a decision is made in step 74 as to the type of event which has been received.

These events can be categorized, as either configuration events related to changes in the network element structure, i.e., cards, nodes, trunks, etc.; or an availability parameter, identifying that a node, call or circuit availability has changed. Finally, certain events such as quality events, i.e., bit error rates which may be reported as events by the node processors of IDNX network 8, may be stored in what is shown as an Event Table 52 in FIG. 2. This Event Table 52 also includes such information that an operator of a node has logged on or logged off, or that the clock time of a node has changed. As events are time stamped by the node, it is important to keep track of any changes in the node clock time in a processor of a respective node.

Assuming that a configuration event has been received, an element ID and nature of the event will be known to the IDNX.EXE36. The IDNX.EXE36 Application Program will issue a QUERY over its query channel to identify pertinent information regarding the event which was reported. The response received from the event log will contain data sufficient to update the tables of FIG. 2 to create a new record, indicating the status of the particular element. The response is parsed in step 76 and used to update the data base table such as the card, trunk or other tables relating to a particular element which has undergone a change, or an "event".

If the particular event received is a availability event, associated with this event is an indication that it either represents a downtime, i.e., the node call or circuit availability has gone down which will create an availability record in step 79. The time the event occurred is stored as downtime in a field of the record in step 80.

Eventually an event will be received indicating that the particular node call or circuit availability has been restored, and this up time 81, constituting a time stamp associated with the event, is stored in step 81 in a field associated with the previously established record. The record is then closed for further processing in step 82. Thus, a record of the availability for a particular node call circuit is preserved for future recording purposes.

The IDNX.EXE36 routine periodically checks the integrity of the data base file to be certain that no event information has been missed. For instance, it will periodically check the availability tables 52, 53, 54 in the data base of FIG. 2, determine if there are any incomplete records, i.e., one with a down time but no corresponding up time indicating it has been restored to service. During this check-out portion of IDNX.EXE36, inquiries will be made to specific nodes, calls and circuits to determine whether or not they have been restored to service. If so, the records are revised with the appropriate up times determined from issuing the query to each of the nodes, calls and circuits which have been indicated to be down.

Further, IDNX will check other records within the table of FIG. 2, i.e., the port record 56, call records 57, card records 58 and trunk card records 49, for any missing information. If it appears that there is an incomplete record, queries are made over the query channel to determine whether or not such information is available, or was missed as a reported event. When information is found from the query, the records are appropriately updated. In the instance of equipment, such as trunk cards 49, other cards 58, calls 57, or ports 56, it is possible that the records may be incomplete due to a missed event reported to the main processor 16. If the remote processor 17 has not supplied this information, this check routine will result in updating of the data base.

The remote processor path is also shown as path 90. Each event arrives at the co-processor 15 in step 93. The event passes through the software interface XIM232.SYS in step 94, and is placed in the event buffer file 43 in step 95. The event is removed from the event buffer file 43 in step 96 as parsed and inserted in the remote buffer file 44 in step 96.

The REMOTE.EXE46 of FIG. 1 will retrieve the events from the remote buffer file 44, and affect through a series of handshake commands with co-processor 15 a transfer of the data file. As part of the protocol process, a decision is made is step 100 as to whether or not the main processor 16 is ready to receive the remote data file 44 contents. In the event there is an indication that the transfer is to be made, the data is transferred in step 101 to the remote data file 34 of FIG. 1. Otherwise, the transfer awaits in step 101 until such time as the main processor 16 indicates the ability to receive it.

The remote processor 16 thus preserves all of the events for processing by the main processor 16. Thus, main processor 16 has two sets of data files, it can compare, to determine whether or not all events have been acquired.

The receipt of various events relating to the configuration of the network and the subsequent processing of the event, including a QUERY to identify all particulars of the event which will update the data base tables, can be explained with respect to several examples.

In the first example, assume that an event message comes in the event channel 13 indicating that a link was installed between N1 and N2. As the process illustrated in FIG. 3 progresses to the point of step 75, a QUERY is sent out over the query channel of the co-processor 14 in accordance with the foregoing format. QUERY LINK,N1 N2. At this point, the trunk card table 49 is to be updated, to build a record reflecting the trunk card used in the link connecting N1 and N2. The QUERY issued to the processor of node 11 will result in the identification of the card, and the information shown in FIG. 2 to be retrieved from the network log. As an example of the network's response to the foregoing QUERY, the following record is obtained:

*LINK N1N2 CONFIGURATION*    BANDWIDTH    T-BUS '
ZERO TRUNK CARDS    STATUS STATE    AVAIL INUSE

-continued

```
RSRVD AVAIL SAT ENC SUPPR ------- ----- -------
-- ------- ----- --- --- ----N1C3  -N2C10   ACTIVE
UP -UNBLCKD 298.0 1185.9 0.0 608 NO NO BEZS N1C16
-N2C51 ACTIVE UP -UNBLCKD 1234.5 249.4 0.0 1728 NO NO
BEZS ---
N2C10 -N1C3 ACTIVE UP -UNBLCKD 298.0 1185.9 0.0 608
NO NO BEZS N2C51 -N1C16 ACTIVE UP -UNBLCKD 1234.5 249.4
0.0 1728 NO NO BEZS
```

This response includes card information regarding the installed links. The card identities are pulled from this record, and a subsequent query is issued to the processor of node 11 for more specific information about the identified cards. This query would take the form of QUERY CARD, N1C3 for example. The response received is shown below, from the QUERY.

```
TRUNK CPU ID: 60         SCLP CPU ID: 27          SLOT TYPE: TRK REV L
DB STATUS: ACTIVE        SATELLITE: NO            NEIGHBOR: 2(RKV I)
SERVICE STATUS: UP       ENCRYPTED: NO            RDNT TRUNK: NONE
BLOCKED: NO                                       DSI CARD: NONE
BER INTRVL: 30 MIN       HIBER THRSHLD: 10E-4     OUTAGE PARMS: 4
SEC/100%
STATE: ACTIVE            SUBSTATE: GET NEXT MSG
TRKBWRESERVED: 0         TRKBWAVAIL: 412272
TRKBWUSE: 1071728/36     CALLS
T-BUSBWAVAIL: 768
SCLP STATE: UP FOR 5054035 SECONDS TO N2C10.
*** TRK CARD N1C3 INTERFACE INFORMATION ***
I/F TYPE: BEZS           BANDWIDTH: 1544 KBPS     ZERO SUPP: BEZS
STATUS: ONLINE           ALARMS:                  LOOPS:
CLOCK REFS: NONE         INTERRUPTS: NONE
*** TRK CARD N1C3 ERROR PERFORMANCE ***
      CURRENT INTERVAL (7 MINS)       LAST BER REPORT INTERVAL
BIT ERRORS: 0 OUT OF    33464328 BITS    0 OUT OF 136892 KBITS
SCLP ERRORS: 0 OUT OF       245 SU'S     0 OUT OF    992 SU'S
FRAME SLIPS:              0 TOTAL                    0 TOTAL
```

From the above record, the following information is retrieved as a result of parsing of the record:
Field Name
card_ID: database identifier
sve_status: from query below, or from link query, the status.
bld_status: from query below, or from link query, the
BER_intvl: from query below, interval for reporting statistics alrm_wait: from query below, outage parameter second
alrm_%: from query below, outage parameter, percentage
neighbor: from query below, neighbor node
avail: from query below, or link query, bandwidth available on link
inuse: from query below, or link query, bandwidth in use on link
rsrvd: from query below, or link query, bandwidth reserved on link In order to complete the record for this event, several QUERIES will be made by IDNX.EXE, so as to complete all fields within the record. As shown in FIG. 2, the Circuit Table 50 is linked to the trunk cards, and must also be updated. An additional QUERY is issued by the IDNX.EXE application program running in the main processor 16 to obtain information for the Circuit Table 50 and Link Table shown in FIG. 2.

Other events reported, are similarly handled. For instance, if a new node is installed, this event is reported, and a QUERY issued back to the node processor to obtain the pertinent data for completing a record in the Node Table 51.

Event tables 52 are processed in step 83 such that plurality of records of a single type are include in the table. There are basically three record types found in the Event Table. Each event has a number of fields in common, as follows:
Fields in common to all three record types
type: From the event message header, the type of the event designating one of 26 categories of network events.
sub_type: From the event message header, the subtype of the event. The type and subtype information relay the meaning of the message.
t_node: From the event message, the node to which the event pertains.
t_crd: From the event message, the card to which the event pertains.
t_port: From the event message, the port to which the event pertains.
r_node: From the event message, the node from which the message was received.
r_date: From the event message, the date on which the event occurred.

In addition to these field, each record type has some additional fields as follows. For a record of the first type, the following additional fields are included:
Record Type x additional fields
t_group: For messages pertaining to DS-1 cards, or PRC cards, this field specifies which of two di-groups the message refers to.
t_op: For messages pertaining to creating or deleting operators, the id of the operator that has been created or removed.
n_card:
n_port:
tx_status: For events that pertain to a change in the operational status of a trunk card, this field indicates the transmit status of the card prior to the event.
rx_status: For events that pertain to a change in the operational status of a trunk card, this field indicates the receive status of the card prior to the event.
operator: The ID of the operator that performed the action specified by the event.
op_node: The node from which the operator performed the action specified by the event.
op_name: In some message fields, the name of the operator who performed the action specified by the event.

As to the remaining two record types, the following additional fields are included:
Record Type y additional fields
date: From an event which specifies that the time and date have been changed on a network node, the time and date after the change.

from_date: From an event which specifies that the time and date have been changed on a network node, the time and date before the change.

Record Type z additional fields seconds: For events that specify trunk statistics, the number of seconds in the reporting interval for the reported statistic.

errors: For events that specify trunk statistics, the number of errors in the reporting interval for the reported statistic.

bits: For events that specify trunk statistics, the number of bits received in the reporting interval for the reported statistic.

frameslips: For events that specify trunk statistics, the number of frame slips that occurred during the reporting interval for the reported statistic.

BER: For events that specify trunk statistics, the calculated bit error rate for the reporting interval for the reported statistic.

All of the messages to be stored in the Event Table of FIG. 2 will be one of these types. It appears that the record of the first type is the most prevalent in the system experience to date. The second type of event record is primarily used to store events that specify that the clock time was changed on a network node by an operator. The third type of record structure is primarily used to store events that pertain to trunk statistics, i.e., bit error rate.

Having thus obtained a complete record of the network events, including changes to network configuration, availability of nodes, calls and circuits, and various other stored events in the Event Table of interest, it is possible to provide the system analyst with a variety of report formats for identifying network activities over time. As records, reflecting changes in the network are preserved, a searching capability will be provided to identify by a beginning date and time and an ending date and time, activities on the network to be reported.

It has been found that certain types of reports comprising information contained on the data base are especially useful to the system analyst. The first of these types of reports fall in the category of availability reports. These availability reports focus on nodes, trunks and calls, commensurate with the availability tables 53–55 maintained in the Data Base Table of FIG. 2.

In response to a prompt on monitor 20, the availability report format may be selected. A second prompt will permit the selection of either node, call or trunk availability reports. A time frame, i.e., date and time through which availability is to be determined, is entered by the system analyst.

These availability reports can be a list of all installed node outages over the reporting period sorted by time, such that only nodes which experienced an outage time will appear in the report. Thus, selecting a node availability events report, the node availability records of Table II will be searched, and each node found to experience a downtime will be reported, along with the down and up times for the node. A computation is made in software to determine the duration of the outage.

Similarly, as part of the availability reporting, a summary report can be produced. This report summarizes the outage time of each installed node over the reporting period. Each node will appear only once in the report along with the computed outage time.

The report can take the form of including the following information:

| Node Availability Summary 12-19-90 Through 1-18-91 | |
|---|---|
| Total Network Node Minutes | 4,320,000 |
| Total Node Outage Minutes | 4,320 |
| Average Node Availability | 99.999% |
| Node ID | Duration |
| Node 001 | 00:01:14 |
| Node 002 | 00:05:04 |
| Node 003 | |
| Node n | |

Thus, when the system analyst enters the date through which the availability summary is to be produced, a report showing total network node minutes, total node outage minutes, and average node availability can be produced.

Similar reports, of course, can be made for the call availability and trunk availability records maintained in the data base.

Detailed reports regarding equipment which is kept in the data base of FIG. 2 can also be generated. As an example of one such report, a utilization report can be generated. During the report period inserted by the system analyst in response to a prompt, a sorted list is produced, by node, grouped by port card type, subgrouped by interface type. As to port type, the report will be sorted by node and then by card type for each node, and then by the interface type. Capacity, representing the number of ports installed of a given card type and interface type, can be automatically generated since the type of cards which are identified by the sort will identify its capacity. The number of ports of a given port type that are installed, represent and in use figure and may be also in the report. An availability and utilization node totals and network total can be computed by dividing the capacity by the in use figure. The node total is the total in use figure divided by total capacity. A network total represents a summation page repeating the above groupings but indicating the totals for all nodes in the network.

Finally, quality reports can be assembled from data within the Event Table 52 of FIG. 2. Since bit error rate statistics are reported at regular intervals ranging from 1 to 60 minutes as events, these are all stored in the Event Table 52. By inserting in response to a prompt a time interval over which bit error rates are to be analyzed, the REPORT.EXE38 will sort the Event Table for all trunk IDs having a bit error rate which exceed a certain threshold also entered by the system in response to a prompt. Each trunk ID meeting the established sort criteria will be reported in a report, including the date and time that bit error rates were experienced.

These report formats are only illustrative of numerous types of reports which can be generated from the all inclusive data base created by the apparatus of FIG. 1. Those skilled in the art will recognize yet other embodiments for generating still other reports by the invention defined by the claims which follow.

What is claimed is:

1. A system for analyzing communications network performance comprising:

a first communications co-processor connected to a node of said network, said communications co-processor having a query channel and event channel connected to said node; and a data processing system connected to said communications co-processor for monitoring said event channel, said data processing system including a first program for initiating a command over said query channel when event data is received from said event channel to identify configuration changes in said communications network, said event data is received asynchronously as events occur, said data processing system storing in a database, information for identifying each new configuration of said network and the time said configuration occurred, said data processing system including a second program to generate reports from said data base identifying configurations of said network at different times.

2. The system according to claim 1 wherein said data base includes data organized in a plurality of tables for each element of said network, each table comprising a plurality of records which identify changes in said elements which occur and the time said changes occur.

3. The system according to claim 2 wherein said data base plurality of tables indicate the time a node or trunk of said network is unavailable.

4. The system according to claim 3 wherein said data base includes an event log for storing information relating to network quality at specific times.

5. The system according to claim 4 wherein said information relating to network quality is a bit error rate of trunks of said network.

6. The system according to claim 3 wherein said second program to generate reports sorts information stored in said data base records in accordance with search report criteria selected by a system operator.

7. The system according to claim 6 wherein said system operator enters a time range as a search and report criteria.

8. The system according to claim 1 further comprising:

a second communications co-processor connected to a second node of said network, said second co-processor having an event channel for receiving network event data from said second node, said event data is received asynchronously as events occur, and being connected to said first communications co-processor; and a remote data processor connected to said second co-processor for receiving said event data, and transferring said event data to said data processing system as backup data in the event said data processing system does not receive said event data from said first communications co-processor.

* * * * *